United States Patent
Carter

(10) Patent No.: US 7,407,114 B2
(45) Date of Patent: Aug. 5, 2008

(54) PLANT POT SHAPED AIR FRESHENING APPARATUS AND SYSTEM COMPRISING SAME

(76) Inventor: Erica Lee Carter, 2915 Bate St., Racine, WI (US) 53403

( * ) Notice: Subject to any disclaimer, the term of this patent is extended or adjusted under 35 U.S.C. 154(b) by 0 days.

(21) Appl. No.: 11/524,595

(22) Filed: Sep. 20, 2006

(65) Prior Publication Data

US 2008/0066379 A1    Mar. 20, 2008

(51) Int. Cl.
- A24F 25/00 (2006.01)
- A61L 9/04 (2006.01)
- B05B 1/00 (2006.01)
- B05B 15/00 (2006.01)
- B05B 17/00 (2006.01)
- A01N 3/00 (2006.01)
- A41G 1/00 (2006.01)

(52) U.S. Cl. .............. 239/59; 239/53; 239/56; 239/57; 239/211; 239/289; 428/17; 428/905

(58) Field of Classification Search .......... 47/66.6, 47/67, 65.5, 66.7, 71, 83, 82, 41.01, 41.11, 47/65.6; 239/59, 58, 57, 43, 49, 51.5, 53, 239/56, 211, 289; 428/17, 905

See application file for complete search history.

(56) References Cited

U.S. PATENT DOCUMENTS

| | | | | |
|---|---|---|---|---|
| 1,648,570 A | * | 11/1927 | White | 47/67 |
| 2,438,129 A | * | 3/1948 | Rich | 239/59 |
| 2,765,194 A | * | 10/1956 | Will | 239/59 |
| D184,893 S | * | 4/1959 | Reinecke | D23/212 |
| 3,220,913 A | * | 11/1965 | Thomas | 239/51.5 |
| 3,848,803 A | * | 11/1974 | Levey | 239/59 |
| 5,353,546 A | * | 10/1994 | Bock | 47/66.6 |
| 5,477,640 A | * | 12/1995 | Holtkamp, Jr. | 47/66.6 |
| 6,854,208 B1 | * | 2/2005 | Chuang et al. | 43/125 |

* cited by examiner

Primary Examiner—Michael R. Mansen
Assistant Examiner—Monica L Williams
(74) Attorney, Agent, or Firm—Raymond M. Galasso; David O. Simmons; Galasso & Associates, LP

(57) ABSTRACT

An air freshening apparatus comprises a plant pot-shaped main body, an end cap body and a scent-emitting composition. The plant pot-shaped main body has a cavity therein defining an open end portion of the plant pot-shaped main body and a closed end portion of the plant pot-shaped main body. The scented air passage extends through the closed end portion of the plant pot-shaped main body. The end cap body is rotatably mounted on an exterior portion of the plant pot-shaped main body. The end cap body has a scented air passage extending therethrough and the end cap body is movable between a position where the scented air passages are at least partially aligned and a position where the scented air passages are fully misaligned. The scent-emitting composition is disposed within the cavity of the plant pot-shaped main body.

8 Claims, 3 Drawing Sheets

PLANT POT SHAPED AIR FRESHENING APPARATUS AND SYSTEM COMPRISING SAME

FIELD OF THE DISCLOSURE

The disclosures made herein relate generally to air freshening apparatuses and, more particularly, to air freshening systems including an air freshening apparatuses and fragrance refill apparatuses.

BACKGROUND

Air fresheners, candles and odor neutralizing sprays can be found in virtually every type of enclosed environments. As people spend more time in the homes, cars and offices, they have a desire for those enclosed environments to smell clean and pleasant. In addition to products that masks or eliminates odors, consumers often have the desire for air freshening products that neutralizes and eliminates offending smells. While there are a wide variety of air freshening products on the market today, consumers continue to search for air freshening products that make a unique and/or desirable statement about their lifestyle in addition to providing air freshening functionality. Evidence of this desire can be found in the sheer number of different styles, colors, designs and scents of air freshening products currently on the market.

Air fresheners for automobiles were initially little more than a cardboard placard that had been impregnated with a scented composition. Eventually, these began to be offered in a myriad of different shapes and were decorated with indicia such as, for example, pictures. Today, air fresheners for automobiles are available in a wide variety of configurations such as, for example, air freshening units with powered fan devices that blow scented air throughout the automobile and air freshening units with powered heating devices that gently warm a scent pad such that scent is emitted from the pad into the air.

Air fresheners for home use were simply solid masses of scent-emitting compositions or a volume of liquid scent emitting composition. Air fresheners for home include a myriad of apparatus that delivery scented air by means for spraying a mist, blowing scented air, heating a scent-emitting composition, etc. Whether the intended application is an interior of an automobile or an interior space of a home or office, the widespread appeal of air freshening apparatuses and the desire for unique and innovative implementations of air freshening apparatuses is clear undeniably clear.

Therefore, a new configuration of air fresher that is unique with respect to known air freshening products would be desirable and useful.

SUMMARY OF THE DISCLOSURE

An air freshening apparatus in accordance with the present invention provides a new configuration of air fresher that is unique with respect to known air freshening products. The air freshener has a main body construction that aesthetically resembles a plant pot. A scented composition is disposed within the main body and one or more scented air passages are provided in the main body for enabling scented air to be released from within the main body. To add a touch of personalization and decor to air freshening apparatuses in accordance with the present invention, a real or artificial plant is disposed within the plant pot-shaped main body.

In one embodiment of the present invention, an air freshening apparatus comprises a plant pot-shaped main body, an end cap body and a scent-emitting composition. The plant pot-shaped main body has a cavity therein defining an open end portion of the plant pot-shaped main body and a closed end portion of the plant pot-shaped main body. The scented air passage extends through the closed end portion of the plant pot-shaped main body. The end cap body is rotatably mounted on an exterior portion of the plant pot-shaped main body. The end cap body has a scented air passage extending therethrough. The end cap body is movable between a position where the scented air passages are at least partially aligned and a position where the scented air passages are fully misaligned. The scent-emitting composition is disposed within the cavity of the plant pot-shaped main body.

In another embodiment of the present invention, an air freshening apparatus comprises a plant pot-shaped main body, an end cap body, a scent-emitting composition and an artificial plant. The plant pot-shaped main body has a cavity therein defining an open end portion of the plant pot-shaped main body and a closed end portion of the plant pot-shaped main body. The scented air passage extends through the closed end portion of the plant pot-shaped main body. The end cap body is rotatably mounted on an exterior portion of the plant pot-shaped main body. The end cap body has a scented air passage extending therethrough. The end cap body is movable between a position where the scented air passages are at least partially aligned and a position where the scented air passages are fully misaligned. The scent-emitting composition is disposed within the cavity of the plant pot-shaped main body. The artificial plant has a base portion thereof removably disposed within the cavity. A foliage portion of the artificial plant extends from within the cavity through the open end portion of the plant pot-shaped main body when the base portion of the artificial plant is disposed within the cavity.

In another embodiment of the present invention, an air freshening system comprises an air freshening apparatus and a scented liquid refill apparatus. The air freshening apparatus includes a plant pot-shaped main body and an end cap body. The plant pot-shaped main body has a cavity therein defining an open end portion of the plant pot-shaped main body and a closed end portion of the plant pot-shaped main body. The end cap body is rotatably mounted on an exterior portion of the plant pot-shaped main body. The end cap body has a scented air passage extending therethrough. The closed end portion of the plant pot-shaped main body has a scented air passage extending therethrough. The end cap body is movable between a position where the scented air passages are at least partially aligned and a position where the scented air passages are fully misaligned. A scented fluid absorption article is disposed within the cavity of the plant pot-shaped main body. The scented liquid refill apparatus includes a watering can-shaped body having a scented fluid reservoir therein at least partially filled with scented fluid. The scented fluid reservoir includes a dispensing passage extending through a spout portion of the watering can-shaped body for enabling the scented fluid to be dispensed from the scented fluid reservoir through the spout portion.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
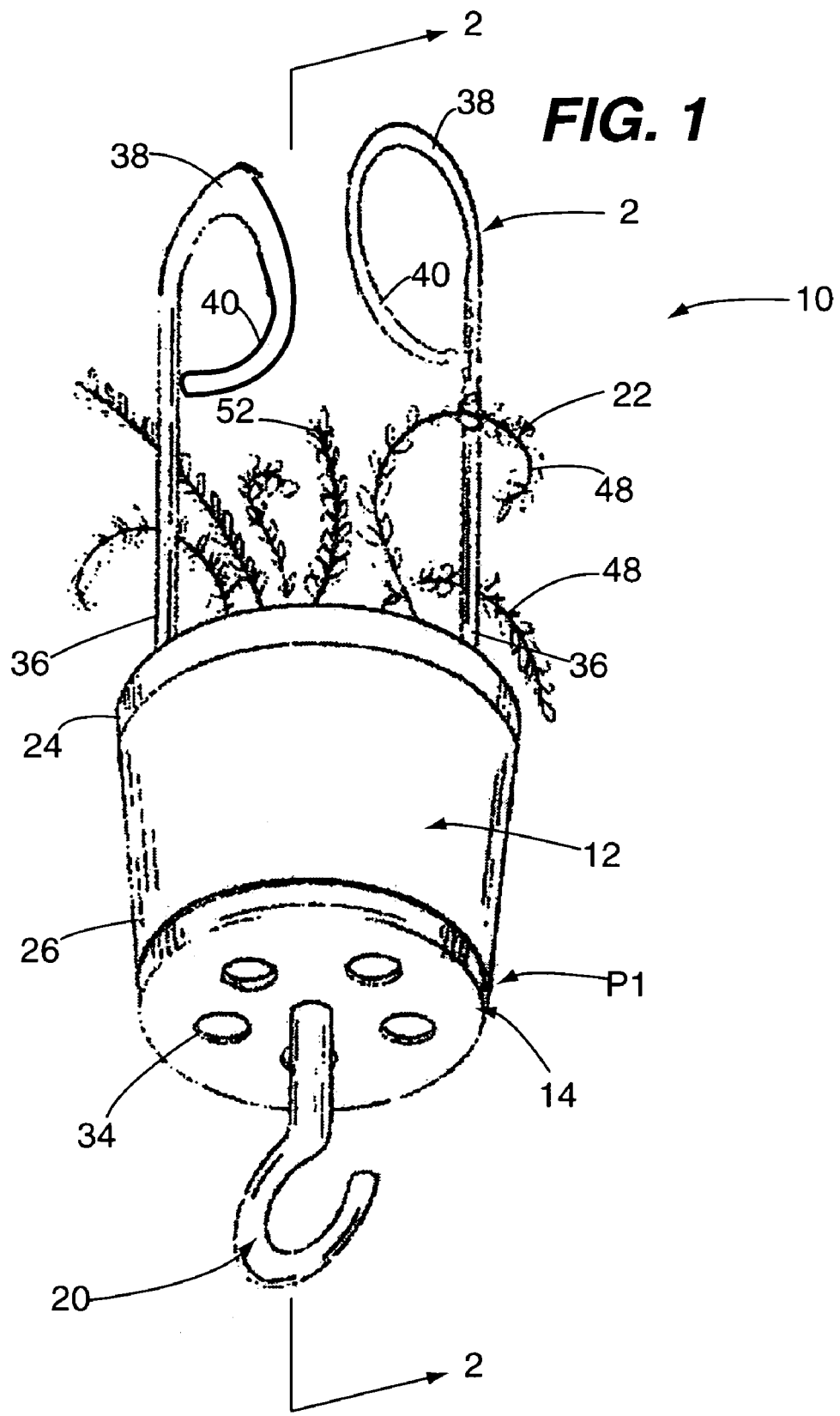
FIG. 1 is a perspective view showing an air freshening apparatus in accordance with the present invention.
Figure 2:
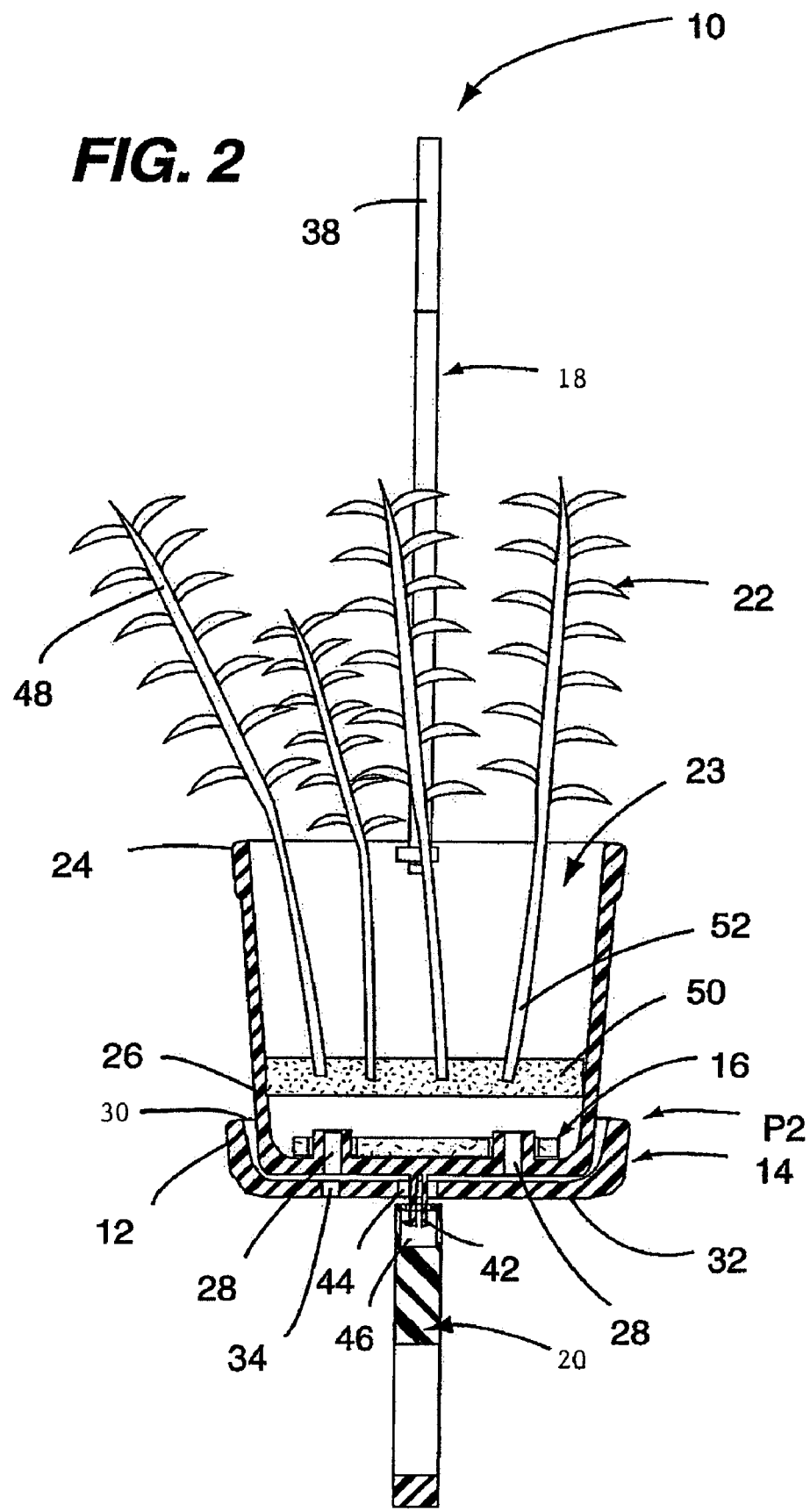
FIG. 2 is a cross-sectional view taken along the line 2-2 in FIG. 1.

FIGS. 1 and 2 show an embodiment of an air freshening apparatus in accordance with the present invention, which is referred to herein as the air freshening apparatus 10. The air freshening apparatus 10 includes a plant pot-shaped main body 12 (i.e., the main body 12), a plant pot saucer-shaped end cap body 14 (i.e., the end cap body 14), a scent-emitting article 16 (FIG. 2), main body hanging structures 18, a hook-shaped support member 20 and an artificial plant 22. The main body 12 has a cavity 23 (FIG. 2) therein defining an open end portion 24 of the main body 12 and a closed end portion 26 of the main body 12. A plurality of scented air passages 28 (FIG. 2) extend through the closed end portion 24 of the main body 12.

The scent-emitting article 16 is disposed within the cavity 23 of the main body 12. An absorbent article (e.g., a sponge) having a scented fluid absorbed therein is one example of the scent-emitting article 16. A solid material made from a scent emitting composition is another example of the scent-emitting article 16. The present invention is not unnecessarily limited by a particular type of scent emitting article. Furthermore, scent emitting articles and compositions are well known and, in view of the disclosures made herein, a skilled person will appreciated implementation of such known scent emitting articles and compositions in practicing the present invention.

The end cap body 14 is rotatably mounted on an exterior portion of the plant pot-shaped main body 12. Preferably, but not necessarily, the end cap body 14 is in the shape of a plant pot saucer. The end cap body 14 has a cavity 28 (FIG. 2) therein defining an open end portion 30 of the end cap body 14 and a closed end portion 32 of the end cap body 14. The closed end portion 26 of the main body 12 is positioned within the open end portion 30 of the end cap body 14.

The end cap body 14 has a plurality of scented air passages 34 (FIG. 1) extending therethrough. The end cap body 14 is movable between a first position P2 where one or more of the scented air passages 28 of the main body 12 are at least partially aligned (FIG. 2) with one or more of the scented air passages 34 of the end cap body 14 and a second position P1 (FIG. 1) where one or more of the scented air passages 28 of the main body 12 are fully misaligned (FIG. 1) with the scented air passages 34 of the end cap body 14. In this manner, a degree of scent emitted from within the main body 12 may be selectively controlled through rotation of the end cap body 14 to a particular relative position with respect to the main body 12. When the scented air passages 28 of the main body 12 are fully misaligned with the scented air passages 34 of the end cap body 14, scented air is emitted at a minimum degree or not at all. When the scented air passages 28 of the main body 12 are fully aligned with at least a portion of the scented air passages 34 of the end cap body 14, scented air is emitted at a maximum degree. A desired degree of scented air emission between the maximum and minimum is achieved by positioning the end cap body 14 such that the scented air passages 28 of the main body 12 are between being fully misaligned and fully aligned with the scented air passages 34 of the end cap body 14. It is disclosed herein that the main body 12 may have the same number or a different number of scented air passages as the end cap body 14. At a minimum, the main body 12 and the end cap body 14 each have one respective scented air passage.

The main body hanging structures 18 has a first end portion 36 and a second end portion 38. The first end portion 36 of each main body hanging structure 18 is attached to the main body 12. The second end portion 38 of each main body hanging structure 18 includes an engagement element 40 (e.g., loop structure, clamp, mounting pad, etc) suitably configured for enabling the second end portion 38 of the main body hanging structure 18 to be attached to and hung from a support structure (e.g., a rear view mirror).

The hook-shaped support member 20 extends from a surface of the end cap body 14. As shown in FIG. 2, in one embodiment, a retention structure 42 (FIG. 2) of the main body 12 attaches the end cap body 14 and the hook-shaped support member 20 to the main body 12. The retention structure 42 extends from an exterior end face of the closed end portion 26 of the main body 12 and extends through an aperture 44 in the end cap body 14. The retention structure 42 is engaged within a cavity 46 of the hook-shaped support member 20. The hook-shaped support member 20 facilitates discrete articles being hung from the air freshening apparatus 10.

An artificial plant 22 has foliage elements 48 and a mounting element 50. A base portion 52 (FIG. 2) of each foliage element 48 is attached to the mounting element 50. In one embodiment, the mounting element 50 is a plastic body (e.g., made of foam). The mounting element 50 and, thus, the base portion 52 of each foliage element 48 is removably disposed within the cavity 23 of the main body 12. A foliage portion 52 of each foliage element 48 extends from within the cavity 23 of the main body 12 through the open end portion 24 of the main body 12 when the mounting element 50 and, thus, the base portion 52 of each foliage element 48 is disposed within the cavity 23 of the main body 12. In this manner, the artificial plant may be selectively removed from and disposed within the cavity 23 of the main body for purposes such as replacing the scent-emitting article 16 with a new one, refilling the scent-emitting article with a supply of scent-emitting composition (e.g., scented oil) and replacing the artificial plant 22 with a different artificial plant.

Figure 3:
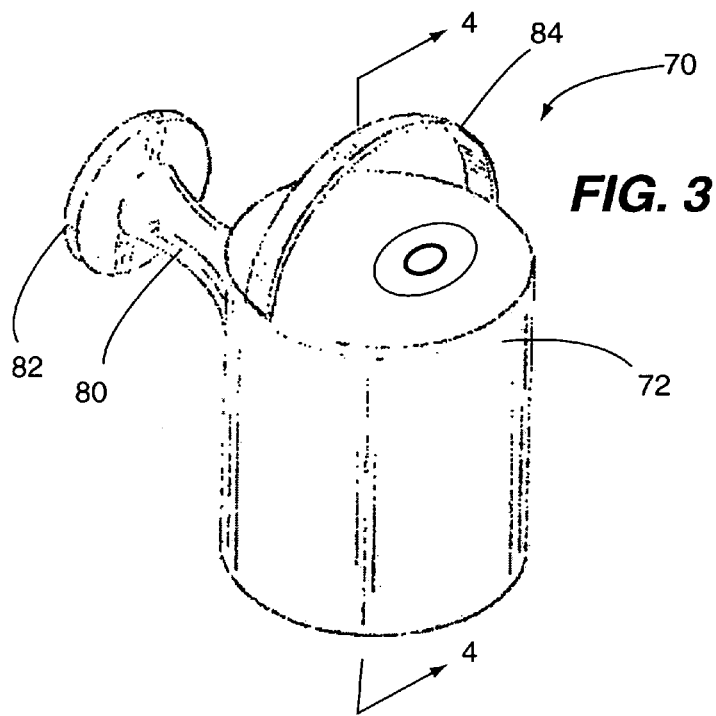
FIG. 3 is a perspective view showing a scented fluid refill apparatus in accordance with the present invention.
Figure 4:
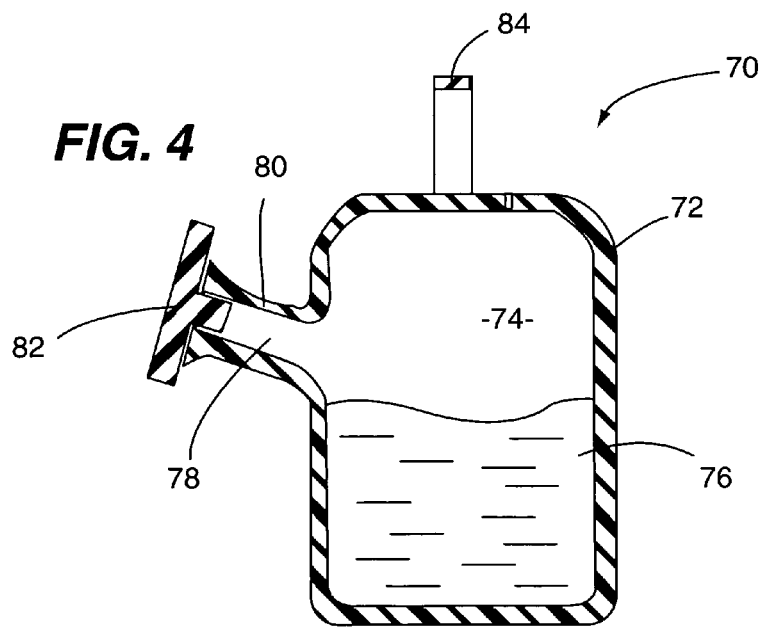
FIG. 4 is a cross-sectional view taken along the line 4-4 in FIG. 3.

Referring now to FIGS. 3 and 4, a scented liquid refill apparatus in accordance with the present invention is discussed and is referred to herein as the scented liquid refill apparatus 70. The scented liquid refill apparatus 70 includes a watering can-shaped body 72 having a scented fluid reservoir 74 (FIG. 4) therein. The scented fluid reservoir 74 is at least partially filled with scented fluid 76 (FIG. 4). The scented fluid reservoir 74 includes a dispensing passage 78 (FIG. 4) extending through a spout portion 80 of the watering can-shaped body 72. The dispensing passage 78 enables the scented fluid 76 to be dispensed from the scented fluid reservoir 74 through the spout portion 80.

The scented liquid refill apparatus 70 serves a means for refilling the scent-emitting article 16 of the air freshening apparatus 10 with a supply of scent-emitting composition (e.g., scented oil). A cap 82 is engageable within the dispensing passage 78 of the watering can-shaped body 72 for preventing unintended spillage of the scented fluid 76. The watering can-shaped body 72 includes a handle portion 84, which may be engaged by the hook-shaped support member 20 of the air freshening apparatus 10 thereby providing for storage of the scented liquid refill apparatus 70. Together, the air freshening apparatus 10 and the scented liquid refill apparatus 70 form an air freshening system, which jointly provide for air freshening functionality.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An air freshening apparatus, comprising:
a plant pot-shaped main body having a cavity therein defining an open end portion of the plant-shaped main body and a closed end portion of the plant pot-shaped main body, wherein a plurality of scented air passages extend through the closed end portion of the plant pot-shaped main body;
an end cap body rotatably mounted on the bottom exterior portion of the plant pot-shaped main body, wherein the end cap body has a plurality of scented air passages extending threrethrough and wherein the end cap body is movable between a first position where said plurality of scented air passages are at least partially aligned and a second position where said plurality of scented air passages are fully misaligned;
a scent-emitting composition within the cavity of the plant-pot shaped main body;
a main body hanging structure having a first end portion and a second end portion, wherein the first end portion is attached to the plant pot-shaped main body and wherein the second end portion includes an engagement element suitably configured for being attached to a support structure;
the end cap is a plant pot saucer shaped end cap body having a cavity therein defining an open end portion of the plant pot saucer shaped end cap body and a closed end portion of the plant pot saucer shaped end cap body;
the closed end portion of the plant pot-shaped main body being positioned within the open end portion of the plant pot saucer shaped end cap body; and
a hook-shaped support member extending from the plant pot saucer shaped end cap body.

2. The air freshening apparatus of claim 1, further comprising:
a fluid absorbent article within the cavity of the plant pot-shaped main body, wherein the scent-emitting composition is a liquid fluid at least partially contained within the absorbent article.

3. An air freshening system, comprising:
an air freshening apparatus including a plant pot-shaped main body and an end cap body, wherein the plant pot-shaped main body has a cavity therein defining an open end portion of the plant pot-shaped main body and a substantially closed end portion of the plant pot-shaped main body, wherein the end cap body is rotatably mounted on the bottom exterior portion of the plant pot-shaped main body, wherein the end cap body has a plurality of scented air passages extending therethrough, wherein the substantially closed end portion of the plant pot-shaped main body has a plurality of scented air passages extending threrethrough, wherein the end cap body is movable between a position where said plurality of scented air passages are at least partially aligned and a position where said plurality of scented air passages are fully misaligned and wherein a scented fluid absorption article is disposed within the cavity of the plant pot-shaped main body;
an artificial plant comprised of foliage elements and a base portion;
a mounting element disposed within the cavity of the main body; said foliage elements removably mounted at the base portion to the mounting element; and
a scented liquid refill apparatus including a watering can-shaped body having a scented fluid reservoir therein at least partially filled with scented fluid, wherein the scented fluid includes a dispensing passage extending through a spout portion of the watering can-shaped body for enabling said scented fluid to be dispensed from the scented fluid reservoir through the spout portion.

4. The air freshening apparatus of claim 3 wherein:
the end cap body is a plant pot saucer-shaped end cap body having a cavity therein defining an open end portion of the plant pot saucer-shaped end cap body and a closed portion of the plant pot saucer-shaped end cap body; and
a closed end portion of the plant pot-shaped main body is positioned within the open end position of the plant pot saucer-shaped end cap body.

5. The air freshening apparatus of claim 4, further comprising:
a hook-shaped support member extending from the plant pot saucer-shaped end cap body.

6. The air freshening apparatus of claim 3, further comprising:
a main body hanging structure having a first end portion and a second end portion, wherein the first end portion is attached to the plant pot-shaped main body and wherein the second end portion includes an engagement element suitably configured for being attached to a support structure.

7. The air freshening apparatus of claim 6 wherein:
the end cap body is a plant pot saucer-shaped end cap body having a cavity therein defining an open end portion of the plant pot saucer-shaped end cap body and a closed end portion of the plant pot saucer-shaped end cap body; and
the closed end portion of the plant pot-shaped main body is positioned within the open end portion of the plant pot saucer-shaped end cap body.

8. The air freshening apparatus of claim 7, further comprising:
a hook-shaped support member extending from the plant pot saucer-shaped end cap body.

* * * * *